No. 873,947.
PATENTED DEC. 17, 1907.
G. E. KELLY & G. F. ROYER.
TRAIN PIPE COUPLING.
APPLICATION FILED OCT. 3, 1906.
2 SHEETS—SHEET 1.
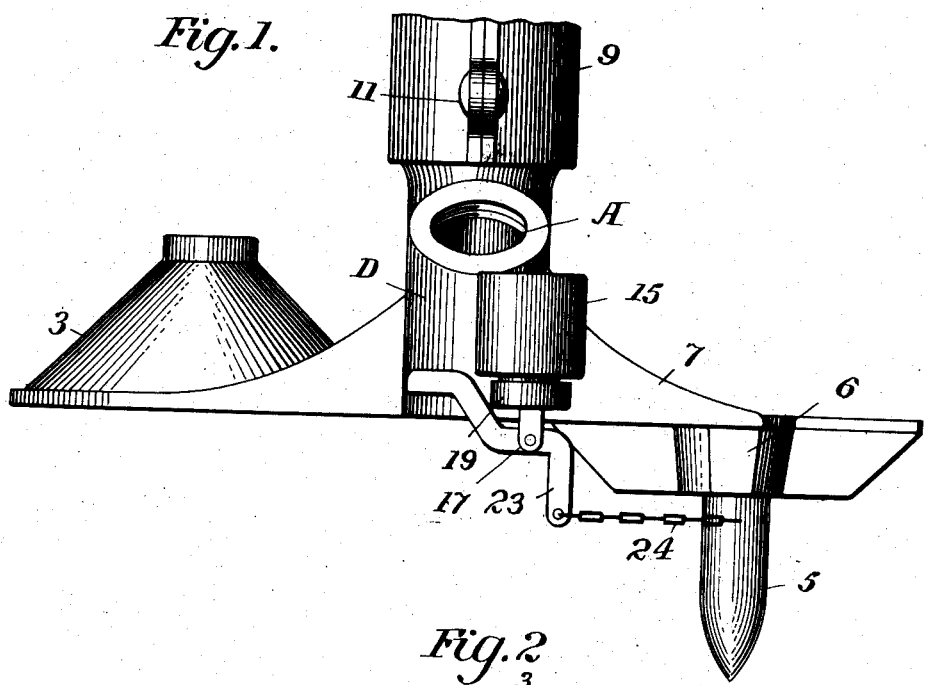
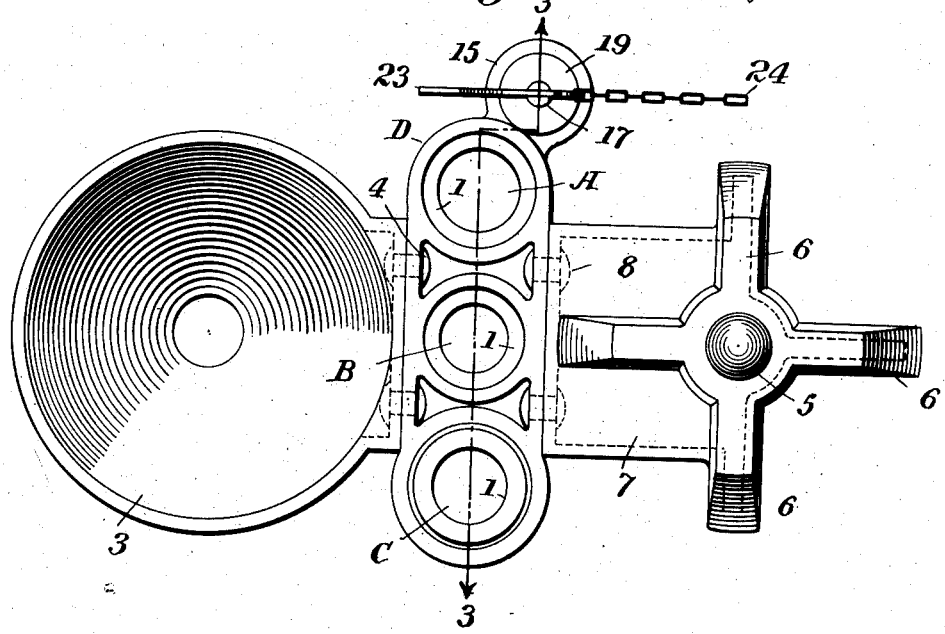
Witnesses
Inventors
George E. Kelly and
George F. Royer
by Foster Freeman & Watson
Attorneys No. 873,947. PATENTED DEC. 17, 1907.
G. E. KELLY & G. F. ROYER.
TRAIN PIPE COUPLING.
APPLICATION FILED OCT. 3, 1906.
2 SHEETS—SHEET 2.
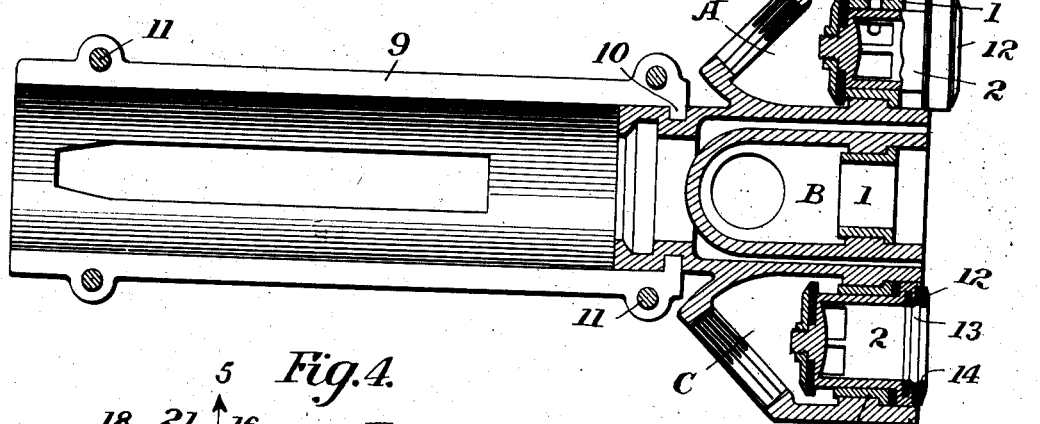
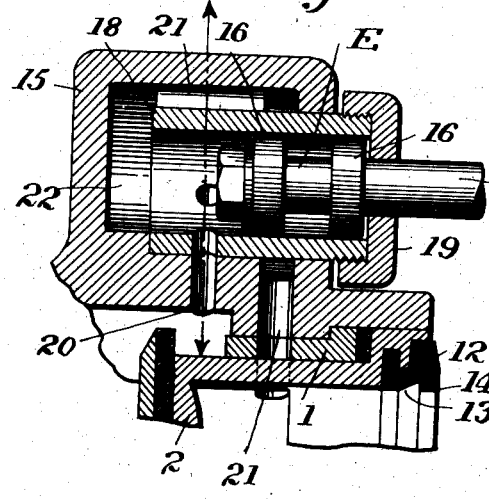
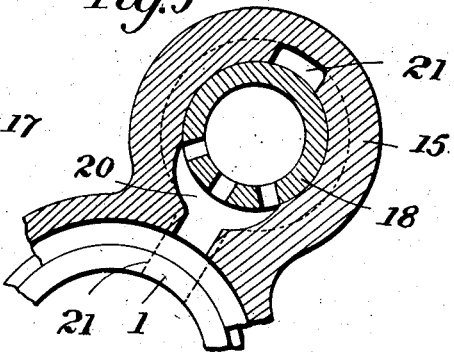
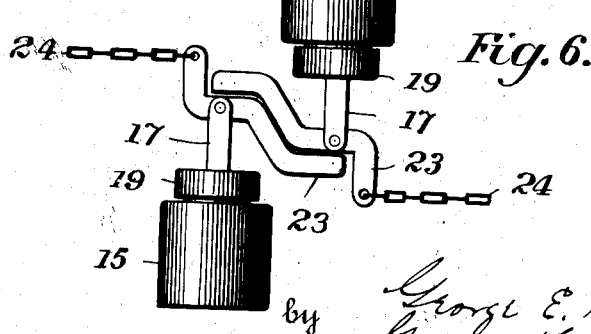
Witnesses
J. G. Hinkel
J. J. McCarthy
Inventors
George E. Kelly
George F. Royer
by Foster Freeman & Watson
Attorneys

UNITED STATES PATENT OFFICE.

GEORGE E. KELLY AND GEORGE F. ROYER, OF WILKES-BARRE, PENNSYLVANIA, ASSIGNORS TO THE KELLY-ARNOLD MANUFACTURING COMPANY, OF WILKES-BARRE, PENNSYLVANIA, A CORPORATION OF PENNSYLVANIA.

TRAIN-PIPE COUPLING.

No. 873,947.     Specification of Letters Patent.     Patented Dec. 17, 1907.

Application filed October 3, 1906. Serial No. 337,258.

*To all whom it may concern:*

Be it known that we, GEORGE E. KELLY and GEORGE F. ROYER, citizens of the United States, residing at Wilkes-Barre, Luzerne county, State of Pennsylvania, have invented certain new and useful Improvements in Train-Pipe Couplings, of which the following is a specification.

Our present invention relates to various improvements upon the automatic coupling for air and steam train pipes which forms the subject matter of our pending application, Serial Number 314,705 filed May 1, 1906.

The several improvements will be described in detail in connection with the accompanying drawing, in which,—

Figure 1 is a plan view partly in section of one of the coupling members: Fig. 2 is a face or end view of the same; Fig. 3 is a section on the line 3—3 of Fig. 2; Fig. 4 is an enlargement of a part of Fig. 3, the valve being shown in a different position; Fig. 5 is a section on the line 5 of Fig. 4, and Fig. 6 is a plan view of the auxiliary air valves, showing their relation when cars are coupled.

Referring to the drawing, A indicates the conduit for the air for operating the brakes, B the steam conduit for the heating system, and C the air conduit for the signal system. In so far as the present invention is concerned, the conduit B may be used for the signal air, and the conduit C for the steam, however. These conduits pass through a head D which is preferably an iron casting. The several openings in the casting are provided with suitable brass bushings 1 in which the valves 2 operate.

On one side of each head D is a funnel 3 which is preferably of stamped sheet metal suitably connected to the head, as by the rivets 4. On the other side of the head is the guide pin 5 mounted in a guide frame 6, the pin 5 and guide frame 6 of each coupling member being adapted to coöperate with the guide funnel of the opposing coupling member. The guide frame and its supporting bracket 7 are also preferably stamped from sheet metal and connected to the head D by suitable means, as by the rivets 8.

The head D is supported in a stem or shank 9, being connected thereto by swivel joint 10. To facilitate the connection of these parts and to effect a light, strong, and economical construction the stem or shank 9 is formed of sheet metal in two halves, each half being provided with flanges 10 which are connected together by means of bolts 11. Heretofore, we have constructed the head, the guide portions, and the stem or shank of our coupler in a single piece, but the construction above described, wherein the head is a casting and the other parts are of stamped sheet metal, secures greater strength, less liability to breakage, and economy of metal and labor without detriment to the operation of the coupling.

In our preferred form of valve, as shown in Figs. 3 and 4, we use a gasket 12 of rubber or other flexible material, having a groove 13 in its inner face and a lip 14 adjacent to the groove. The lip provides a yielding surface adapted to make close contact with the corresponding lip of the opposing valve, and the grooves 13 permit steam or air pressure to operate on the rear face of the lips and hold them together, thus securing tight joints between the coupling members. It will be understood that each end of each car is equipped with identical coupling members, that the guide pins and funnels cause the opposing coupling members to register exactly, and that when the cars are coupled together the gaskets 12 of the opposing valves register and abut, thus coupling the steam and air pipes of one car to the steam and air pipes respectively of the adjoining car.

We provide means for setting the brakes upon any car or cars which become accidentally detached from a train, while, at the same time, if the cars be intentionally detached, the brakes need not be set. For this purpose we use auxiliary valves E which are constructed and operated as follows:—The valves E are located in cases 15 which are preferably integral with and on the upper ends of the heads D. When the coupling members are connected, the valves E, which may be termed safety valves, stand in their forward positions, as shown in Fig. 4, and when the cars are intentionally disconnected, the valves are left in their rearward positions as shown in Fig. 3, as will be presently explained. As shown, each valve E comprises two cup-leathers 16 suitably connected to a valve stem 17. The valve operates in a bushing 18 in the casing 15, the forward end of the bushing being closed by a suitable cap 19. A passage 20 provides communication between the rear portion of the valve chamber and the air conduit A, and a separate passage 21 provides communication between the middle portion of the bushing 1 of the main air valve and a space 22 at the back of the valve E. The valve stem of each safety valve E is provided with a bent operating lever 23 which is pivotally connected with the valve stem. One arm of each lever 23 is connected with a chain or other connection 24 running to the side of the car, by means of which the valve may be operated, and the other arm of the lever is arranged to operate the valve stem of the opposing safety valve as shown in Fig. 6.

The operation of the safety valves is as follows:—When the cars are coupled air enters the passages 21 and passes to the chamber 22 in the rear of the valves, thus forcing the safety valves forward to the position shown in Fig. 4, and the valves normally stand in this forward position while the train is in running condition. When it is desired to uncouple a car without setting the brakes on it, one of the chains 24 is pulled, thus throwing the safety valves at the coupling which is to be disconnected to the rear into the position shown in Fig. 3. While the valves are thus held in this position the car is uncoupled and the main air valves immediately cut off the air from the passage 21. The air entering the passage 20 operates equally upon the opposing cup-leathers 16, and does not tend to shift the valve E. The brakes may be set by simply pulling out the valve E to its forward position, as shown in Fig. 4, thus permitting the air to escape through the channels 20 and 21. Should a train break accidentally, the valves E where the break occurs, will be left in their forward positions, as shown in Fig. 4, and the air in the rear portion of the train will escape through the channels 20 and 21, thus setting the brakes. The engineer will be notified by the air whistle of the break in the train, and he can maintain the requisite pressure in the forward part of the train to prevent setting of the brakes such as would permit the rear portion of the train to collide with the front portion.

Having described our invention, what we claim and desire to secure by Letters Patent is:—

1. In an automatic steam and air coupling for railway cars, the combination with the head D having the air and steam conduits, of the sheet metal guide members suitably connected to said head, substantially as set forth.

2. In an automatic air and steam coupling for railway cars, the combination with the head D having the air and steam conduits, of the sheet metal shank or stem for supporting said head, the head having a swivel connection with the shank or stem.

3. In an automatic air and steam coupling for railway cars, the combination with the head D having the air and steam conduits, of the sheet metal shank or stem consisting of two flanged portions suitably connected together and connected to the head by a swivel joint.

4. In an automatic air and steam coupling for railway cars, the combination with the head D having the air and steam conduits, of the complementary guide portions formed of sheet metal and secured upon opposite sides of the head, and the sheet metal shank or stem connected with the head by a swivel joint.

5. The combination with an automatic air coupler for train brake pipes, of a safety valve adapted and arranged to permit the escape of air from a car accidentally detached from a train, and means for adjusting the safety valve to prevent the discharge of air through said valve when desired.

6. The combination with an automatic air coupler for train brake pipes, of a safety valve on each coupler section, and means for operating said valves simultaneously to prevent the escape of air when uncoupling a car.

7. The combination with an automatic air coupler for train brake pipes comprising a head D and a main air valve 2 operating therein, of a safety valve adjacent to the main air valve, said safety valve being adapted and arranged to permit the escape of air upon accidental separation of the coupling, and means for adjusting said valve to prevent the escape of air when the coupling is intentionally separated.

8. The combination with an automatic air coupler for train brake pipes comprising a head D and a main air valve 2 operating therein, of a safety valve adjacent to the main air valve, said safety valve comprising opposing cups or pistons mounted upon a common stem, and the valve chamber of said valve having a passage communicating with the main air pipe at all times, and a second passage controlled by the main air valve.

9. The combination with an automatic air coupler for railway cars, of a safety valve constructed and arranged to permit the escape of air from a car or cars accidentally disconnected from a train, and means for manually operating the safety valve.

10. The combination with an automatic air coupler for railway cars, of a safety valve on each coupler section, and means for operating said valves, the means for operating each valve being adapted to simultaneously operate the adjacent valve, for the purpose set forth.

In testimony whereof we affix our signatures in presence of two witnesses.

GEORGE E. KELLY.
GEORGE F. ROYER

Witnesses:
 JOHN J. O'DONNELL,
 EDWARD N. NOLL.